(12) United States Patent  
Zhang et al.

(10) Patent No.: US 9,513,778 B1  
(45) Date of Patent: Dec. 6, 2016

(54) DEFINING OBJECTS USING AN OBJECT-RELATIONSHIP MAP

(71) Applicant: CA, Inc., Islandia, NY (US)

(72) Inventors: Shouhong Zhang, Beijing (CN); Daocheng Chen, Beijing (CN)

(73) Assignee: CA, Inc., New York, NY (US)

( * ) Notice: Subject to any disclaimer, the term of this patent is extended or adjusted under 35 U.S.C. 154(b) by 384 days.

(21) Appl. No.: 13/929,033

(22) Filed: Jun. 27, 2013

(51) Int. Cl.
*G06F 15/177* (2006.01)
*G06F 3/0484* (2013.01)
*G06F 11/32* (2006.01)

(52) U.S. Cl.
CPC .......... *G06F 3/0484* (2013.01); *G06F 11/323* (2013.01)

(58) Field of Classification Search
None
See application file for complete search history.

(56) References Cited

U.S. PATENT DOCUMENTS

| | | | | |
|---|---|---|---|---|
| 7,181,438 B1* | 2/2007 | Szabo | ............... | G06F 17/30522 705/14.14 |
| 8,982,129 B1* | 3/2015 | Broekhuijsen | .... | G06F 17/30961 345/440 |
| 2002/0057269 A1* | 5/2002 | Barber | .................. | G06F 3/0481 345/418 |
| 2003/0135619 A1* | 7/2003 | Wilding | ................. | G06Q 10/06 709/225 |
| 2004/0044678 A1* | 3/2004 | Kalia | ................ | G06F 17/30595 707/999.102 |
| 2004/0225967 A1* | 11/2004 | Hassanin | .............. | G06F 9/4448 715/760 |
| 2004/0267694 A1* | 12/2004 | Sakai | ................ | G06F 17/30876 707/999.001 |
| 2005/0182773 A1* | 8/2005 | Feinsmith | .............. | G06Q 10/10 707/999.1 |
| 2009/0037848 A1* | 2/2009 | Tewari | ................... | G06Q 30/06 715/835 |
| 2013/0262522 A1* | 10/2013 | van Rotterdam | . | G06F 17/30289 707/802 |
| 2014/0019370 A1* | 1/2014 | Chandra | .......... | G06Q 10/06313 705/301 |
| 2014/0189557 A1* | 7/2014 | O'Connell, Jr. | .... | G06F 17/3089 715/767 |

* cited by examiner

*Primary Examiner* — Hua Lu
(74) *Attorney, Agent, or Firm* — Pillsbury Winthrop Shaw Pittman LLP

(57) ABSTRACT

Systems and methods are provided to define an object within an object-relationship map. Relationship information about a relationship between a plurality of objects is used to generate and display an object-relationship map. The object-relationship map may include a graphical representation having nodes corresponding to the objects, and a node connection corresponding to the object relationship. A definition status of an object representing whether the object is definable is indicated by a state of a visual indicator associated with the node corresponding to that object. In response to an indication by the visual indicator state of a node that a corresponding at least one of the objects is definable, a user input indicating interaction with a node is received and responsive to the node interaction, a definition interface, e.g., a pop-up window, is provided to receive object information defining the one or more objects.

26 Claims, 4 Drawing Sheets

DEFINING OBJECTS USING AN OBJECT-RELATIONSHIP MAP

BACKGROUND

The present disclosure relates to object creation in software and business-related applications, and more specifically, to object creation using an object-relationship map.

BRIEF SUMMARY

In general, various aspects discussed in this disclosure relate to defining an object using, and within, an object-(or entity-)relationship map. According to one aspect of the present disclosure, a system including a processor to define an object within an object-relationship map is provided. The processor may be configured to receive relationship information about a relationship between a plurality of objects, and process the relationship information to generate and display, e.g., on an associated display device, an object-relationship map. The object-relationship map may comprise a graphical representation having nodes corresponding to the plurality of objects, and a node connection corresponding to and depicting the relationship between the plurality of objects. Further, in this system, a definition status of an object representing whether the object is ready to be defined (or is "definable") may be indicated by a state of a visual indicator associated with the node corresponding to the object. The visual indicator may include a color, a shape, or a size of a node.

Responsive to an indication by the state of the visual indicator associated with at least one of the nodes that a corresponding at least one of the objects is definable, the processor may receive a user input indicating an interaction with at least one of the nodes by a user. Responsive to the user input, the processor may provide a definition interface (e.g., a pop-up window) to receive, from the user, object information which defines at least in part the one or more objects corresponding to the at least one of the nodes. The user input may be one or more mouse clicks, pointing or hovering a pointer on a screen at a specific position, a touch input, a gesture input, or an audio input.

The object-relationship map may represents a hierarchical relationship structure of the plurality of objects such that at least one of the nodes is a base node having a dependent node, wherein the object corresponding to the dependent node cannot be defined before defining the object corresponding to the base node.

According to another aspect of the present disclosure, a method to define an object within an object-relationship map is provided. The method (e.g., executed by a processor) may include receiving relationship information about a relationship between a plurality of objects, and based on the relationship information, generating and displaying an object-relationship map. The object-relationship map may include a graphical representation having nodes corresponding to the plurality of objects, and a node connection corresponding to the relationship between the plurality of objects. A definition status of an object representing whether the object is definable may be indicated by a state of a visual indicator associated with the node corresponding to the object. The visual indicator may include a color, a shape, or a size of a node.

The method may further include, responsive to an indication by the state of the visual indicator associated with at least one of the nodes that a corresponding at least one of the objects is definable, receiving a user input indicating an interaction with at least one of the nodes by a user, and responsive to the user input, providing a definition interface (e.g., a pop-up window) to receive object information from the user defining at least in part the one or more objects corresponding to the at least one of the nodes.

According to another aspect of the present disclosure, a computer-readable medium including computer-executable instructions to define an object within an object-relationship map is provided. The instructions when executed by a processor cause the processor to implement a method and/or system presented in this disclosure.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWINGS

Aspects of the present disclosure are illustrated by way of example and are not limited by the accompanying figures, with like references indicating like elements.

DETAILED DESCRIPTION

Typically, wizard or form pages may be used to create or define an object, in which only one object may be created in one wizard or form page. When creating an object which is dependent on other objects, the user may need to create those dependent objects first. For example, if a user wants to create or define an object "User Story" (e.g., as part of a project management software), the user may first navigate to the User Story creation page in the wizard, and find that User Story is dependent on the "Sprint" object. Accordingly, to first define the Sprint object, the user navigates to the Sprint object creation page in the wizard, and may find that a "Release" object needs to be defined first, and so on. After all the dependent relationships are determined, the user would need to remember the relationships, and create these objects one-at-a-time in their dependency order by navigating to different object creation pages in the wizard. This object creation process is inefficient as the user has to manually figure out and remember the dependency relationships for defining an object, and it may involve navigating many pages in the wizard to create one object.

Figure 1:
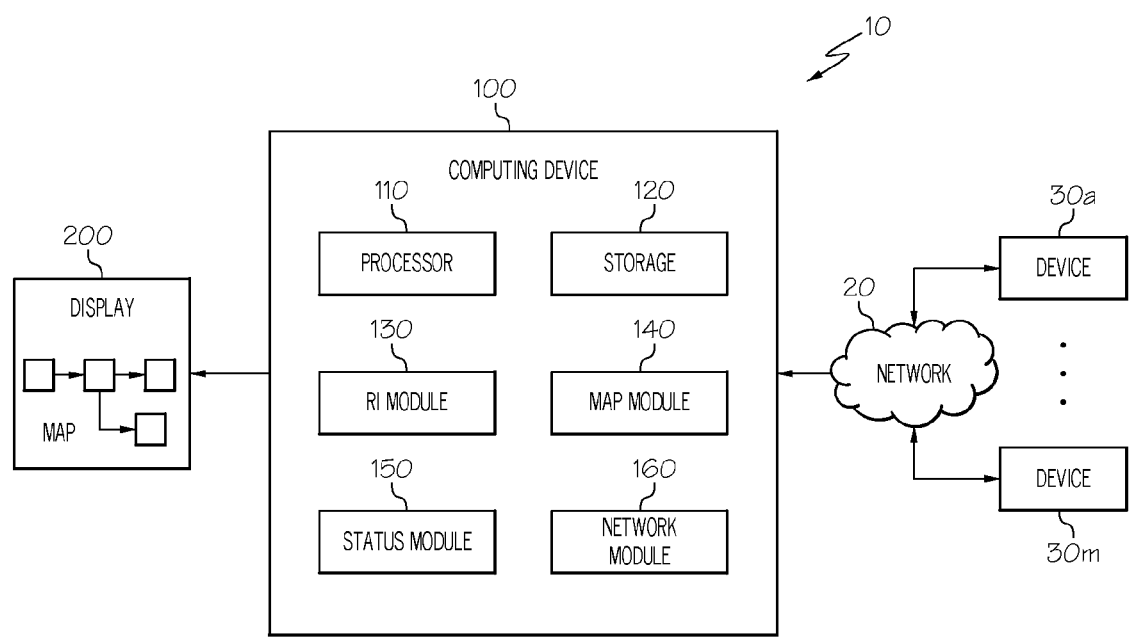
FIG. 1 illustrates an embodiment of a system to provide and interact with an object-relationship map, according to various implementations.

FIG. 1 illustrates a block diagram of an embodiment of a system 10 which facilitates defining or creating objects within an object-relationship map. System 10 may include a network 20, a computing device 100 and a display device 200. The computing device 100 may include a processor or processing device 110 configured to perform some or all functionalities of a plurality of modules of device 100. In some implementations, computing device 100 may comprise a non-transitory, tangible computer-readable storage medium, e.g. storage 120, with various data, information and executable programs stored thereon. One of the programs may be designed to instruct a microprocessor (e.g., processor 110) to perform some or all functionalities of the plurality of modules discussed in this disclosure. The plurality of modules within or otherwise operationally-associated with computing device 100 may include, for example, a relationship information (RI) module 130, a map module 140, and a status module 150, and/or other modules.

In general, computing device 100 is configured to create, define and process objects and their relationships to each other using a graphical representation of the objects and their relationships. The term "object" or "objects" discussed herein generally relates to individual items or entities of, e.g., a project management software (e.g., CA Agile Vision™ software from CA Technologies), an integrated development environment (IDE) for software development, a database, a business process, or other processes, products or systems in which the components involved therein could be individually identified and manipulated and may have specific relationships with other components. The graphical representation of objects and their relationships may be in the form of an object (or entity-)relationship map in which individual objects or entities are graphically depicted as nodes, and their relationships are graphically depicted as line connections between the nodes. The object-relationship map may be generated and processed at computing device 100 (by one or more modules thereof), and then displayed in a graphical user interface (GUI), touch user interface or any other user interface which facilitates human-computer interaction provided by computing device 100 and presented on display device 200. In some embodiments, the underlying process, product, database, or system for which the object-relationship map is generated and interacted with, as described herein, is supported by and operational at computing device 100, and/or at one or more devices 30*a*-30*n*.

In the object-relationship map, each object and/or relationship may have one or more specific attributes, and the object and/or relationship may be considered as "created" or "defined" if some or all of its attributes have been provided with appropriate values. In some embodiments, however, if an instance of object and/or relationship is configured with a minimal number of attributes having values (e.g., an object with only its "name" attribute having a specific value), the object and/or relationship are not considered as "defined" in that case. Rather, the object and/or relationship are considered as "defined" only when a certain number of attributes, e.g., greater than a known threshold number, are assigned their respective appropriate values.

In some embodiments, one or more modules of computing device 100 are configured such that the displayed object-relationship map is an interactive map which can be interacted with for editing by users or operators of computing device 100. Generally, user interactions with the object-relationship map may include, e.g., user inputs through one or more input devices connected to device 100 in the form in mouse clicks, pointing or hovering a pointer on a screen at a specific position, a touch input, a gesture input, an audio input, and/or other user inputs. Further, such user interactions with the object-relationship map may be directed to creating or defining new objects and/or relationships, viewing information related to existing objects and/or relationships, and/or editing existing objects and/or relationships (e.g., by changing their attributes' values, rearranging or deleting the objects and/or relationships on the map such that the map layout is changed, etc.).

Referring now to specific modules of computing device 100 in FIG. 1, in some implementations, RI module 130 is configured to receive information related to objects and their respective relationships with other objects, e.g., from one or more devices 30*a*-30*n*. The received information may include basic information about objects, e.g., minimal pre-defined object attributes (including, e.g., name of the object), how and to which other object(s) is a particular object related, and/or other basic attributes. The information received at RI module 130 may be in a file in Extensible Markup Language (XML) format or JavaScript Object Notation (JSON) format.

RI module 130 may provide the received information to storage module 120 for storing a copy of the received information, and also to map module 140 for parsing and processing the received information to generate an object-relationship map graphically depicting the objects and their relationships. In addition to map module 140, such basic information may be in a format that can be parsed and processed by other modules of device 100, e.g., using processor 110. In some embodiments, in a scenario where the object-relationship map (presented by map module 140) is edited to create, change or delete one or more relationships by a user, the updated relationship information and identification of the related affected objects is sent from map module 140 to RI module 130. RI module 130 may then process and forward the updated relationship information to storage module 120 to update or replace the previously-stored relationship information.

Map module 140 may be configured to receive the relationship information from RI module 130, and process the relationship information to generate and display (e.g., in a GUI on display device 200) one or more editable, interactive object-relationship maps. As discussed above, an object-relationship map may be a graphical representation having nodes each representing one of the objects, and node connections each representing a relationship between two objects. In some embodiments, map module 140 process the relationship information to generate an object-relationship based on, or using techniques related to, Unified Modeling Language (UML).

In some embodiments, nodes in an object-relationship map are graphical elements, e.g., in the form of a four-sided figure (such as square, rectangle, etc.), a circular figure, or of any other shape. Further, in some embodiments, node connections are in the form of connecting lines between nodes. The connecting lines may be directional, e.g., using an arrow symbol at one or both ends of a connecting line, to indicate a specific relationship (or a specific type of relationship) between objects/nodes connected by that line. In some embodiments, nodes and node connections are of different shapes, sizes, color, or have other one or more varying visual properties, based on types of objects and types of relationships, respectively.

There may be different types of relationships between objects, e.g., one-to-one relationships, one-to-many relationships, and many-to-many relationships. In a one-to-one relationship, one instance of an entity or object is associated with one other instance of another entity or object. For example, in a database of employees, each employee name is associated with only one social security number.

In a one-to-many relationship, one instance of a first entity or object is associated with zero, one or many instances of a second entity or object, but for one instance of the second entity or object there is only one instance of the first entity or object. For example, for a company with all employees working in one building, the building (a first object) is associated with many different employees (second objects), but those employees all share the same singular association with the first object, i.e., the building.

In a many-to-many relationship, one instance of a first entity or object is associated with one, zero or many instances of a second entity or object, and one instance of the second entity is associated with one, zero or many instances of the first entity. For example, for a company in which all of its employees work on multiple projects, each instance of an employee (a first object) is associated with many instances of a project (a second object), and at the same time, each instance of a project (the second object) has multiple employees (the first objects) associated with it.

In some embodiments, relationships between objects are such that the resulting object-relationship map (generated by map module 140) depicts a hierarchical node structure in which one or more nodes are base nodes each having one or more dependent nodes which are directly dependent upon and connected to the respective base node. Accordingly, relationship between a base object and its dependent object may be depicted on the object-relationship map with a directional node connection line between the base node and its dependent node, the line having, e.g., an arrowhead symbol facing toward and contacting the dependent node at one end of the connection line. In some embodiments, two or more base nodes have a same dependent node. The hierarchical node structure may be multi-tiered (i.e., having multiple levels) such that one or more nodes which are dependent nodes for one or more base nodes have their own one or more dependent nodes, and so on. In some embodiments, upon processing by map module 140, the relationship information for a set of objects indicates that only a portion of those objects are related in the hierarchical manner. As such, map module 140 may render different object-relationship maps for objects with hierarchical relationship and for objects without hierarchical relationship. Alternatively, map module 140 may generate only one object-relationship map with a portion depicting a hierarchical node structure for objects with hierarchical relationship.

In some embodiments, the object-relationship map generated by map module 140 includes one or more dynamic-display elements, e.g., a "+" symbol and/or a "−" symbol on the map. In accordance with user input to activate or actuate the "+" symbol, map module 140 may display or expand a hidden portion of the displayed object-relationship map, and similarly, In accordance with user input to activate or actuate the "−" symbol, map module 140 may hide or collapse a portion of the displayed object-relationship map.

As discussed above, the received object/relationship information at RI module 130 may only include basic information about objects, e.g., minimal pre-defined object attributes, such as, object's name, and its relationship information. In such a case, if the object having values for no or only up to a minimal number of attributes (e.g., a first preset threshold), the object may be considered as "undefined." If, however, the object has values for a number of its attributes between the minimal number of attributes (e.g., the first preset threshold) and the sufficient number of attributes (e.g., a second preset threshold), the object may be considered as "partially defined." Further, if the object has values for a number of its attributes at least equal to the sufficient number of attributes (e.g., the second preset threshold), the object may be considered as "defined."

The object-relationship map generated and presented to a user (e.g., through a GUI) by map module 140 may be interactive in that, responsive to user inputs (e.g., mouse clicks or other user inputs), map module 140 allows objects depicted on the map to receive new, additional and/or changed values for their respective attributes from the user to fully or partially define (or redefine) the objects. For example, in response to a user input received at the user interface indicating an interaction by the user with a node of the object-relationship map, map module 140 may provide a definition interface for the user to view, edit or provide new object information (e.g., attributes' values) which define or redefine the object corresponding to that interacted-with node. The user input for interaction with the node may include one or more mouse clicks, hovering a pointer at or near a specific location on the screen, a touch input, and/or a gesture input, in relation to the general area in the user interface where the node is displayed, an audio input to interact with node (e.g., voice commands from the user), and/or other user inputs. The definition interface may include a pop-up window in an area overlaying the object-relationship map on the user interface. In this case, the pop-up window becomes the active window on the user interface (with the object-relationship map in the background, but still accessible and partially visible), through which the user is able to view, edit or add new object information (e.g., attributes' values) to define or redefine the object.

In some embodiments, in the case where objects have a hierarchical relationship therebetween, map module 140 does not allow the object corresponding to the dependent node to be defined before the object(s) corresponding to its base node(s) are defined.

In addition to facilitating viewing, adding or editing object information through user inputs to the interactive object-relationship map, map module 140 may also be configured to allow further manipulation with the object-relationship map. For example, map module 140 may be arranged to extend, reduce or otherwise alter the structure of the object-relationship map beyond the object/relationship information provided by RI module 130 to map module 140 (based on the object-relationship map was generated by map module 140 in the first place). In some embodiments, map module 140 allows, receives, and processes user inputs indicating interactions with the displayed map to add or delete nodes on the map, such that corresponding new objects are added or existing objects are deleted, respectively. If a new object or node is added to the map, the user may be able to further interact with the new node to input object information and define the new object (in the manner described above). If, however, a node is deleted from the map, the corresponding object instance, attributes' values, and relationships are deleted. Further, in some embodiments, map module 140 allows, receives, and processes user inputs indicating interactions with the displayed map to create, edit or delete node connections, such that corresponding new relationships between are created, or existing relationships are amended or deleted, respectively.

The object-relationship map may also include a visual indicator associated with each node on the map to signal a definition status of the object(s) corresponding to each node, the definition status indicating whether the object(s) is ready to be defined or is definable. Alternatively, a visual indicator associated with each node on the map may signal a definition status of the corresponding object(s) in terms of whether the one or more of those objects are, e.g., undefined, partially defined, or defined. In some embodiments, map module 140 provides data related to the current definition status of each node to status module 150, and based on that data, status module 150 renders one of multiple variable "states" of the visual indicator for the node on the displayed object-relationship map. For example, the visual indicator may include color, shape, and/or size associated with a node, and as such, status module 150 may indicate different definition statuses of an object by using distinct colors, shapes, and/or sizes of the corresponding node (i.e., different "states" of the visual indicator).

In some embodiments, for example, with regard to the hierarchical node structure of the map, status module 150 may use a first state (e.g., a first color) of the visual indicator of a dependent node to indicate that the dependent node cannot be defined (or is not definable) because its base node is not yet defined; a second state (e.g., a second color) of the visual indicator of the dependent node to indicate that the dependent node cannot be defined because its base node is defined but not yet selected by the user on the rendered object-relationship map; and a third state (e.g., a third color) of the visual indicator of the dependent node to indicate that the dependent node can now be defined because the base node is defined and selected on the object-relationship map. The states of a visual indicator (whether or not related to the hierarchical node structure) are not limited to the above-discussed first, second, and third states of the visual indicator. Status module 150, however, may utilize more or less number of states of the visual indicator representing more or less number of status possibilities for each node, or combinations of status possibilities for each base-dependent node pair. Status module 150 may update the state of the visual indicators to indicate the latest definition status of the objects either automatically upon receipt of definition status data from map module 140, or in response to a user input to fetch the latest definition status data from map module 140 and update the visual indicators accordingly.

Figure 2A:
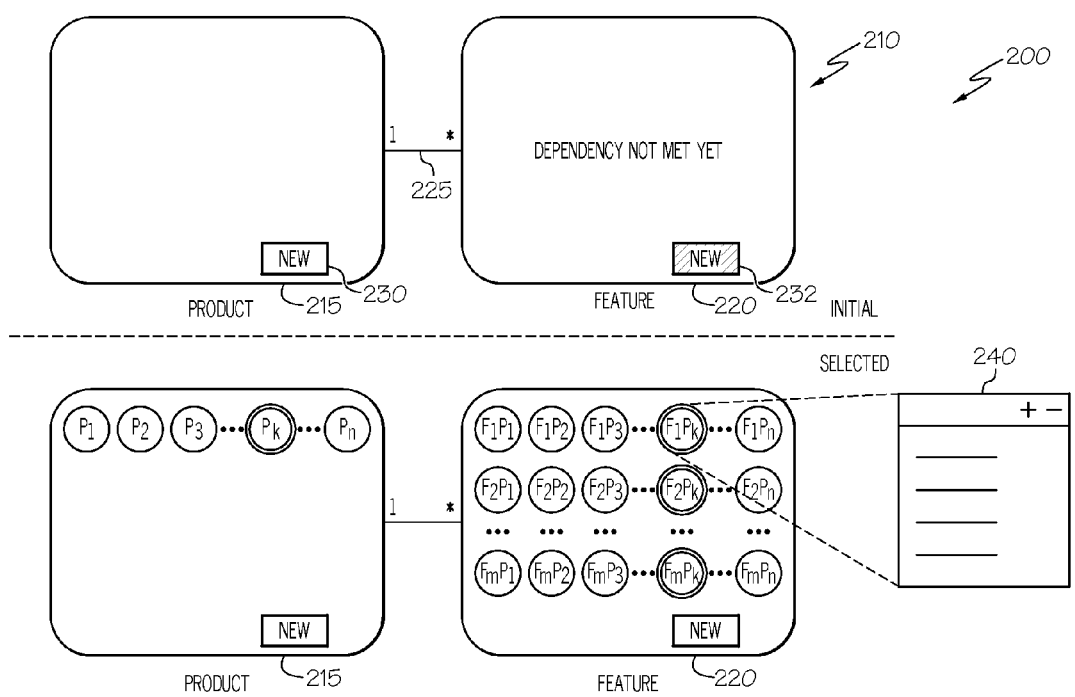
FIGS. 2A-2B illustrate various object-relationship maps, according to various implementations.
Figure 2B:
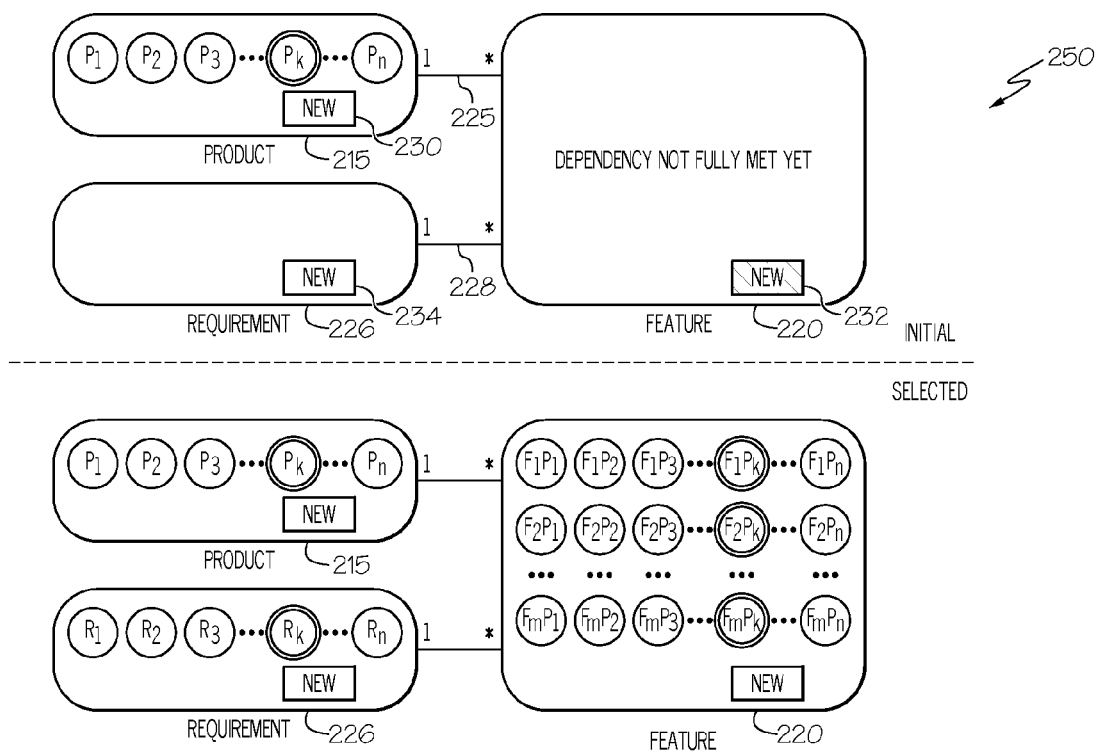

FIGS. 2a-2b depict various object-relationship maps 200 according to various embodiments described in this disclosure. For example, FIG. 2a illustrates an object-relationship map 210 (or a portion thereof) having two nodes—node 215 representing an object "Product," and node 220 representing an object "Feature." Map 210 may be generated by map module 140 based on the received object and relationship information (as discussed above). The two objects may be directly related such that the Feature object is dependent on the Product object. As such, node 215 may be a base node and node 220 may be a dependent node connected by a direct node connection 225. Both nodes 215, 220 include respective visual indicators 230, 232, which indicate a current status of the corresponding object (Product, Feature), e.g., by displaying different colors.

Initially, the two objects of nodes 215, 220 may not be defined, and because of the hierarchical structure, a user may not be able to define the Feature object (i.e., "dependent" node) before defining the Product object (i.e., "base" node). With respect to visual indicators, because creating or defining the Product object (i.e., node 215) is not dependent upon the definition status of any other object or node, visual indicator 230 may display green color indicating that the Product object is ready to be defined, but visual indicator 232 may display gray color to indicate that the Feature object (i.e., node 220) cannot be defined because the Product object is not yet defined. The user may first define an instance $P_k$ of the Product object, and for that, the user may provide an input through the user interface (e.g., mouse click, touch input, etc.) to select $P_k$ at node 215, and map module 140 may detect and process the user input to provide and display a pop-up window 240 on the user interface, through which the user may input values to define Product $P_k$. Once the instance $P_k$ of the Product object (at node 215) is defined, but not yet selected by the user, visual indicator 232 of the Feature object may display yellow color to indicate that the Feature object (i.e., node 220) (still) cannot be defined because the Product object is defined but not selected.

The user may then select $P_k$ in node 215, e.g., using a mouse click, and the selection may be displayed as a highlighted circle over $P_k$. Further, the selection of $P_k$ may result in automatic highlighting of corresponding or related one or more of m instances, $F_1$-$F_m$, of the Feature object at node 220, and at this instance visual indicator 232 may display green color to indicate that the one or more of m instances, $F_1$-$F_m$, of the Feature object are ready to be defined because the Product object/node $P_k$ is defined and selected. Responsive to the green color at indicator 232, the user may provide an input through the user interface (e.g., mouse click, touch input, etc.) to select a feature instance (e.g., $F_1P_k$) to define. Map module 140 may detect and process the user input to provide and display a definition interface, e.g., a pop-up window 240, on the user interface. The user may then input values in window 240 to define the feature $F_1P_k$.

FIG. 2b illustrates an object-relationship map 250 (or a portion thereof) having three nodes—node 215 representing an object "Product," node 220 representing an object "Feature," and node 226 representing an object "Requirement." The three objects may be related such that the Feature object is dependent on both the Product and Requirement objects. As such, both nodes 215, 226 may be base nodes and node 220 may be a dependent node connected by a direct node connection 225 to node 215 and node connection 228 to node 226. Nodes 215, 220, 226 include respective visual indicators 230, 232, 234, which indicate, e.g., by displaying different colors, whether the corresponding object (Product, Feature, Requirement) is ready to be defined. Map 250 and its features related to defining objects may be similar to that of map 210 discussed above.

Returning to FIG. 1, network module 160 may be configured to transmit and receive information between one or more devices of system 10 and/or external to system 10. For example, network module 160 may maintain one or more electronic communication links via which computing device 100, devices 30a . . . 30n, network 20, and/or external resources may be operatively linked. For example, such electronic communication links may be established, at least in part, via a network such as the Internet and/or other networks. It will be appreciated that this is not intended to be limiting, and that the scope of this disclosure includes implementations in which network module 160 may facilitate the operative linking of computing device 100, devices 30a-30n, network 20, and/or external resources via some other communication media.

Computing device 100 may be any computing device such as, for example, a server, a desktop computer, laptop computer, personal digital assistant, smart phone, and/or any other computing device. Other configurations and system architectures may be used. For example, although not shown, computing device 100 may be or include one or more servers connected to one or more clients via a network 20 such as a Wide Area Network, Local Area Network, the Internet, a cloud-based network and/or other wired or wireless network or a combination thereof. Computing device 100 may be capable of communicating with network 20, and one or more other devices, such as devices 30a-30n.

Computing device 100 may include one or more processors 110 configured to execute computer program modules. The computer program modules may be configured to provide functionality attributed herein to computing device 100.

Storage module 120 may comprise electronic storage media that electronically stores information non-transiently. The electronic storage media of storage module 120 may include one or both of system storage that is provided integrally (i.e., substantially non-removable) with computing device 100 and/or removable storage that is removably connectable to computing device 100 via, for example, a port (e.g., a USB port, a firewire port, etc.) or a drive (e.g., a disk drive, etc.). Storage module 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Storage module 120 may include one or more virtual storage resources (e.g., cloud storage, a virtual private network, and/or other virtual storage resources). Storage module 120 may store software algorithms, information determined by processor 110, information received from computing device 100, information received from devices 30a-30n, and/or other information that enables computing device 100 to function as described herein.

Processor(s) 110 may provide information processing capabilities within computing device 100. As such, processor 110 may include one or more of a digital processor, an analog processor, a digital circuit designed to process information, an analog circuit designed to process information, a state machine, and/or other mechanisms for electronically processing information. Although processor 110 is shown in FIG. 1 as a single entity, this is not intended to be limiting, as processor 110 may include a plurality of processors operating in coordination or cooperation. This may include implementations in which computing device 100 includes a multi-processor device, a farm of server devices operating together, and/or virtual resources provided by the cloud. The processor 110 may be configured to execute various modules of device 100, e.g., modules 130, 140, 150, and/or 160. Processor 110 may be configured to execute the modules by software; hardware; firmware; some combination of software, hardware, and/or firmware; and/or other mechanisms for configuring processing capabilities on processor 16.

It should be appreciated that although modules 120, 130, 140, 150, and/or 160 are illustrated in FIG. 1 as being co-located within a single processing unit, in implementations in which processor 110 includes multiple processing units, one or more of modules 120, 130, 140, 150, and/or 160 may be located remotely from the other modules. The description of the functionality provided by the different modules 120, 130, 140, 150, and/or 160 provided in this disclosure is for illustrative purposes, and is not intended to be limiting, as any of modules 120, 130, 140, 150, and/or 160 may provide more or less functionality than is described. For example, one or more of modules 120, 130, 140, 150, and/or 160 may be eliminated, and some or all of its functionality may be provided by other ones of modules 120, 130, 140, 150, and/or 160. As another example, processor 110 may be configured to execute one or more additional modules that may perform some or all of the functionality attributed below to one of modules 120, 130, 140, 150, and/or 160.

Devices 30a-30n may be any computing device such as, for example, a server, a desktop computer, laptop computer, personal digital assistant, smart phone, and/or any other computing device. Other configurations and system architectures may be used. For example, although not shown, devices 30a-30n may be or include one or more servers connected to one or more other devices and/or to computing device 100 via a network 20 such as a Wide Area Network, Local Area Network, the Internet, a cloud-based network and/or other network or combination thereof. The devices 30a-30n may be capable of communicating with network 20, storage module 120 and one or more other devices, such as computing device 100. Applications executed via system 10 may be distributed across one or more of devices 30a-30n. The storage 120 may store information related to all available applications, components, and/or other information related to devices 30a-30n.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
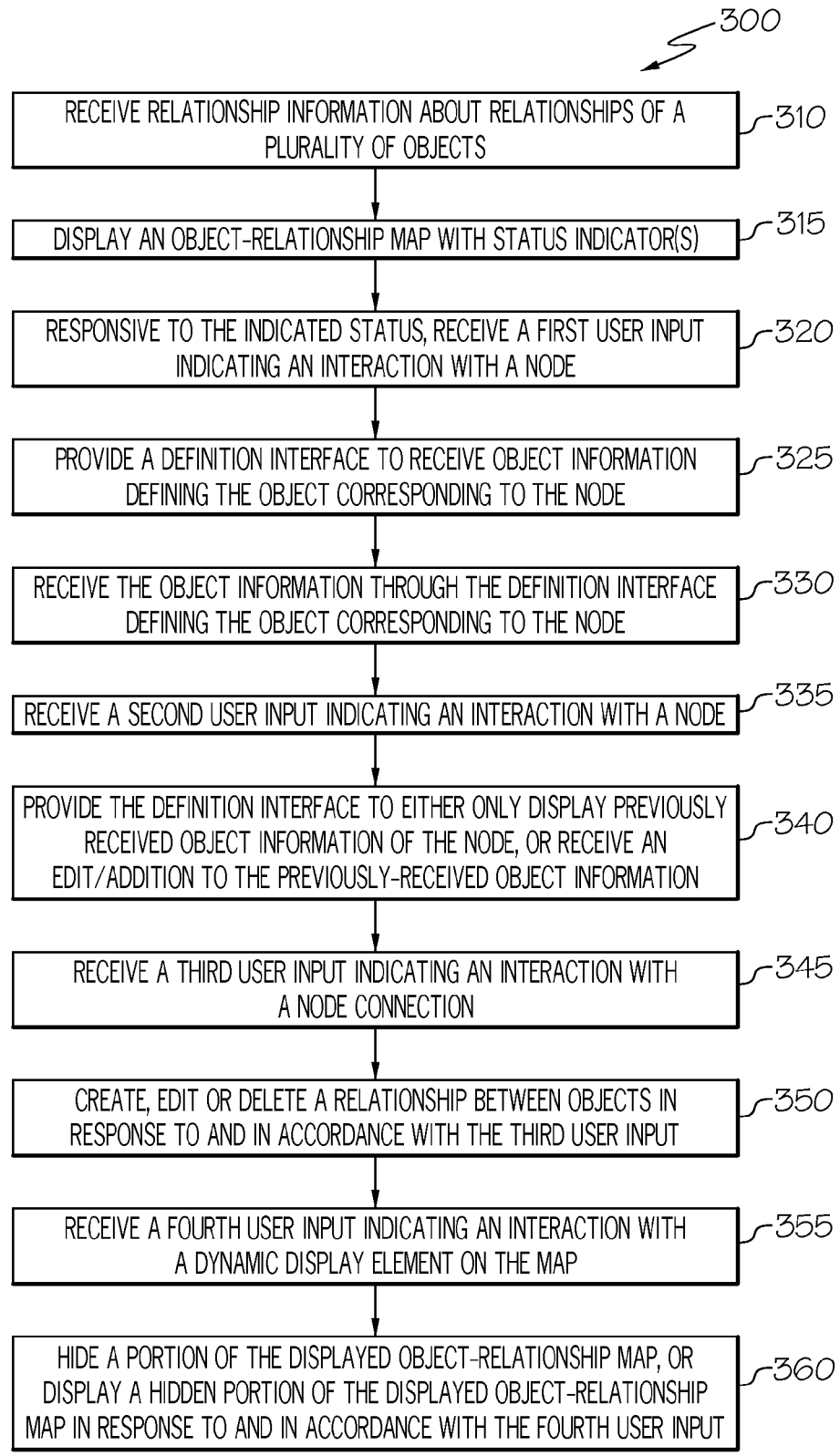
FIG. 3 illustrates an embodiment of a method to provide and interact with an object-relationship map, according to various implementations.

FIG. 3 illustrates a method 300 to define objects within and using an object-relationship map. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 310, object and relationship information about relationships of a plurality of objects may be received at device 100, e.g., from one or more devices 30a-30n. In some embodiments, the object and relationship information is stored in storage module 120 and provided to RI module 130, which provides the information to map module 140 for further processing.

At an operation 315, based on the object and relationship information, an object-relationship map may be generated and displayed, e.g., by map module 140 on display 200. As discussed above, the object-relationship map may include a graphical representation having nodes corresponding to the objects, and node connections corresponding to the relationships associated with the objects. Further, a definition status of an object representing whether the object is definable may be indicated by a state of a visual indicator associated with the node corresponding to the object.

At an operation 320, responsive to an indication by the state of the visual indicator associated with at least one of the nodes that a corresponding at least one of the objects is definable, a first user input indicating an interaction with the one of the nodes (of the displayed object-relationship map) by a user may be received, e.g., at map module 140. Further, at an operation 325, responsive to the first user input, a definition interface (e.g., a pop-up window) may be provided on the user interface, e.g., by map module 140, to receive object information defining the object corresponding to the one of the nodes.

At an operation 330, the object information may be received from the user via the definition interface.

At an operation 335, a second user input indicating an interaction with one of the nodes by the user may be received. Responsive to and in accordance with the second user input, at an operation 340, map module 140 may render the definition interface on the user interface to display previously-received object information of the object corresponding to the one of the nodes, or receive an edit/addition to the previously-received object information.

At an operation 345, a third user input to create, edit, or delete a node connection on the map may be received. Responsive to and in accordance with the third user input, at an operation 350, map module 140 may create, edit, or delete a relationship between objects represented by the node connection affected by the third user input.

The object-relationship map may include an interactive dynamic-display element. At an operation 355, a fourth user input indicating interaction with the dynamic-display element may be received. Responsive to and in accordance with the fourth user input, at an operation 360, map module 140 may hide a portion of the displayed object-relationship map, or display a hidden portion of the displayed object-relationship map to the user.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific aspects and implementations of the technology, and performing certain actions. However, it will be apparent that such descriptions are merely for convenience, and that such actions may in fact result from computing devices, processors, controllers, or other devices executing firmware, software, routines or instructions.

The systems described herein are embodiments of system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, style sheet language such as Cascade Style Sheets (CSS), or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A system to define an object within an object-relationship map, the system comprising a processor configured to:
   receive relationship information about a relationship between a plurality of objects;
   process the relationship information to generate and display an object-relationship map, wherein the object-relationship map comprises a graphical representation having nodes corresponding to the plurality of objects, and a node connection corresponding to the relationship between the plurality of objects, wherein an object is definable if a value of an attribute of the object is assignable based on object information received from a user, and a definition status of an object representing whether the object is definable is indicated by a state of a visual indicator associated with the node corresponding to the object;
   responsive to an indication by the state of the visual indicator associated with at least one of the nodes that a corresponding at least one of the objects is definable, receive a first user input indicating an interaction with the at least one of the nodes by the user; and
   responsive to the first user input, provide a definition interface to receive, from the user, object information defining at least in part the one or more objects corresponding to the at least one of the nodes.

2. The system of claim 1, wherein the visual indicator comprises a color, a shape, or a size of a node.

3. The system of claim 1, wherein the definition interface comprises a pop-up window.

4. The system of claim 1, wherein the processor is further configured to:
   receive a second user input indicating an interaction with at least one of the nodes by the user; and
   responsive to the second user input, provide the definition interface to either only display previously-received object information of the one or more objects corresponding to the at least one of the nodes interacted with by the second user input, or receive, from the user, an edit to the previously-received object information.

5. The system of claim 1, wherein the object-relationship map comprises a dynamic-display element responsive to activation of which the processor is configured to hide a portion of the displayed object-relationship map, or display a hidden portion of the displayed object-relationship map.

6. The system of claim 1, wherein the object-relationship map represents a hierarchical relationship structure of the plurality of objects such that at least one of the nodes is a base node having a dependent node, wherein the object corresponding to the dependent node cannot be defined before defining the object corresponding to the base node.

7. The system of claim 6, wherein two or more base nodes have a same dependent node.

8. The system of claim 6, wherein a first state of the visual indicator of the dependent node indicates that the dependent node cannot be defined because the base node is not yet defined, a second state of the visual indicator of the dependent node indicates that the dependent node cannot be defined because the base node is defined but not yet selected on the graphical representation, and a third state of the visual indicator of the dependent node indicates that the dependent node can be defined because the base node is defined and selected.

9. The system of claim 1, wherein the processor is further configured to:
   receive a second user input to create, edit, or delete a node connection; and responsive to the second user input, create, edit, or delete a relationship between objects represented by the node connection.

10. A method to define an object within an object-relationship map, the method comprising:
receiving, by a processor, relationship information about a relationship between a plurality of objects;
based on the relationship information, generating and displaying, by the processor, an object-relationship map, wherein the object-relationship map comprises a graphical representation having nodes corresponding to the plurality of objects, and a node connection corresponding to the relationship between the plurality of objects, wherein an object is definable if a value of an attribute of the object is assignable based on object information received from a user, and a definition status of an object representing whether the object is definable is indicated by a state of a visual indicator associated with the node corresponding to the object;
responsive to an indication by the state of the visual indicator associated with at least one of the nodes that a corresponding at least one of the objects is definable, receiving, by the processor, a first user input indicating an interaction with the at least one of the nodes by the user;
responsive to the first user input, providing, by the processor, a definition interface to receive object information from the user defining at least in part the one or more objects corresponding to the at least one of the nodes.

11. The method of claim 10, wherein the visual indicator comprises a color, a shape, or a size of a node.

12. The method of claim 10, wherein the definition interface comprises a pop-up window.

13. The method of claim 10, further comprising:
receiving a second user input indicating an interaction with at least one of the nodes by the user; and
responsive to the second user input, providing the definition interface to either only display previously-received object information of the one or more objects corresponding to the at least one of the nodes interacted with by the second user input, or receive, from the user, an edit to the previously-received object information.

14. The method of claim 10, wherein the object-relationship map comprises a dynamic-display element and the method further comprises:
receiving a second user input indicating interaction with the dynamic-display element; and
responsive to the second user input, hiding a portion of the displayed object-relationship map, or displaying a hidden portion of the displayed object-relationship map.

15. The method of claim 10, wherein the object-relationship map represents a hierarchical relationship structure of the plurality of objects such that at least one of the nodes is a base node having a dependent node, wherein the object corresponding to the dependent node cannot be defined before defining the object corresponding to the base node.

16. The method of claim 15, wherein two or more base nodes have a same dependent node.

17. The method of claim 15, wherein a first state of the visual indicator of the dependent node indicates that the dependent node cannot be defined because the base node is not yet defined, a second state of the visual indicator of the dependent node indicates that the dependent node cannot be defined because the base node is defined but not yet selected on the graphical representation, and a third state of the visual indicator of the dependent node indicates that the dependent node can be defined because the base node is defined and selected.

18. The method of claim 10, further comprising:
receiving a second user input to create, edit, or delete a node connection; and
responsive to the second user input, creating, editing, or deleting a relationship between objects represented by the node connection.

19. A computer program product comprising:
a non-transitory computer readable storage medium comprising computer-readable program code embodied therewith to define an object within an object-relationship map, the computer readable program code comprising:
computer readable program code configured to receive relationship information about a relationship between a plurality of objects;
computer readable program code configured to process the relationship information to generate and display an object-relationship map, wherein the object-relationship map comprises a graphical representation having nodes corresponding to the plurality of objects, and a node connection corresponding to the relationship between the plurality of objects, wherein an object is definable if a value of an attribute of the object is assignable based on object information received from a user, and a definition status of an object representing whether the object is definable is indicated by a state of a visual indicator associated with the node corresponding to the object;
computer readable program code configured to, responsive to an indication by the state of the visual indicator associated with at least one of the nodes that a corresponding at least one of the objects is definable, receive a first user input indicating an interaction with the at least one of the nodes by the user;
computer readable program code configured to, responsive to the first user input, provide a definition interface to receive, from the user, object information defining at least in part the one or more objects corresponding to the at least one of the nodes.

20. The computer program product of claim 19, wherein the visual indicator comprises a color, a shape, or a size of a node.

21. The computer program product of claim 19, wherein the definition interface comprises a pop-up window.

22. The computer program product of claim 19, further comprising:
computer readable program code configured to receive a second user input indicating an interaction with at least one of the nodes by the user; and
computer readable program code configured to, responsive to the second user input, provide the definition interface to either only display previously-received object information of the object corresponding to the at least one of the nodes interacted with by the second user input, or receive, from the user, an edit to the previously-received object information.

23. The computer program product of claim 19, wherein the object-relationship map comprises a dynamic-display element, and further comprising:
computer readable program code configured to receive a second user input indicating interaction with the dynamic-display element; and
computer readable program code configured to, responsive to the second user input, hide a portion of the displayed object-relationship map, or display a hidden portion of the displayed object-relationship map.

24. The computer program product of claim 19, wherein the object-relationship map represents a hierarchical relationship structure of the plurality of objects such that at least one of the nodes is a base node having a dependent node, wherein the object corresponding to the dependent node cannot be defined before defining the object corresponding to the base node.

25. The computer program product of claim 24, wherein a first state of the visual indicator of the dependent node indicates that the dependent node cannot be not defined because the base node is not yet defined, a second state of the visual indicator of the dependent node indicates that the dependent node cannot be defined because the base node is defined but not yet selected on the graphical representation, and a third state of the visual indicator of the dependent node indicates that the dependent node can be defined because the base node is defined and selected.

26. The computer program product of claim 19, further comprising:
- computer readable program code configured to receive a second user input to create, edit, or delete a node connection; and
- computer readable program code configured to, responsive to the second user input, create, edit, or delete a relationship between objects represented by the node connection.

* * * * *